US012365816B2

(12) United States Patent
Kim et al.

(10) Patent No.: US 12,365,816 B2
(45) Date of Patent: Jul. 22, 2025

(54) ADHESIVE GRIPPER COMPRISING A SHAPE MEMORY POLYMER FOR PICK-AND-PLACE APPLICATIONS

(71) Applicant: The Board of Trustees of the University of Illinois, Urbana, IL (US)

(72) Inventors: Seok Kim, Pohang (KR); ChangHee Son, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 1077 days.

(21) Appl. No.: 17/320,720

(22) Filed: May 14, 2021

(65) Prior Publication Data

US 2021/0363388 A1    Nov. 25, 2021

Related U.S. Application Data

(60) Provisional application No. 63/027,061, filed on May 19, 2020.

(51) Int. Cl.
*C09J 7/35* (2018.01)
*B32B 27/12* (2006.01)
*C09J 5/06* (2006.01)

(52) U.S. Cl.
CPC ............. *C09J 7/35* (2018.01); *B32B 27/12* (2013.01); *C09J 5/06* (2013.01); *C09J 2463/00* (2013.01)

(58) Field of Classification Search
CPC ...... B25J 15/008; C09J 7/35; C09J 5/06; C09J 2463/00; C09J 163/00; C09J 2301/208; C09J 2301/21; C09J 2301/30; C08G 59/504; C08G 59/226
See application file for complete search history.

(56) References Cited

U.S. PATENT DOCUMENTS

| 9,815,261 B2 * | 11/2017 | Browne ............... B25J 15/008 |
| 2012/0007375 A1 * | 1/2012 | Vittor .................. B25J 15/02 264/322 |
| 2015/0352586 A1 | 12/2015 | Kim et al. |
| 2015/0359043 A1 | 12/2015 | Kim et al. |

(Continued)

FOREIGN PATENT DOCUMENTS

WO    WO-2018144618 A1 *    8/2018    ............. B32B 37/12

OTHER PUBLICATIONS

Zhou et al., "Bio-Inspired Soft Grippers Based on Impactive Gripping", Advanced Science 2021, vol. 8, 2002017 (Year: 2021).*

(Continued)

*Primary Examiner* — Scott R. Walshon
(74) *Attorney, Agent, or Firm* — Crowell & Moring LLP

(57) ABSTRACT

An adhesive gripper for pick-and-place maneuvers comprises one or more legs, where each leg terminates in a foot rotatably connected to the respective leg. Each foot includes a SMP dry adhesive comprising a shape memory polymer, and a rigid backing layer attached to a back side of the SMP dry adhesive, such that a front side of the SMP dry adhesive is available for attachment and release of objects. The adhesive gripper further includes a handle portion connected to the one or more legs, a release mechanism comprising a release ring within the handle portion, and one or more releasing rods integrated with the one or more legs for release of an object onto a substrate.

14 Claims, 17 Drawing Sheets

(56) References Cited

U.S. PATENT DOCUMENTS

2018/0100046 A1    4/2018    Kim et al.
2018/0179421 A1    6/2018    Kim et al.

OTHER PUBLICATIONS

Astin, "Finger force capability: measurement and prediction using anthropometric and myoelectric measures," M.S. thesis, Dept. Ind. and Syst. Eng., Virginia Polytechnic Institute and State University, Blacksburg, VA (1999) pp. 1-103.
Cecil et al., "A review of gripping and manipulation techniques for micro-assembly applications," *Int. J. of Prod. Res.*, vol. 43, No. 4 (2005) pp. 819-828.
Chen, "Gripping mechanisms for industrial robots," *Mechanism and Mach. Theory*, vol. 17, No. 5 (1982) pp. 299-311.
Cho et al., "A robotic finger driven by twisted and coiled polymer actuator," in *Electroactive Polymer Actuators and Devices (EAPAD)* 2016, Proceedings of SPIE, vol. 9798 (2016), pp. 97981J-1 to 97981J-7.
Eisenhaure et al., "An internally heated shape memory polymer dry adhesive," *Polymers*, vol. 6, No. 8 (2014) pp. 2274-2286.
Eisenhaure et al., "High-strain shape memory polymers as practical dry adhesives," *Int. J. of Adhesion and Adhesives*, vol. 81 (2018) pp. 74-78.
Eisenhaure et al., "Microstructured shape memory polymer surfaces with reversible dry adhesion," *ACS Applied Materials & Interfaces*, vol. 5, No. 16 (2013) pp. 7714-7717.
Eisenhaure et al., "The use of shape memory polymers for MEMS assembly," *J. of Microelectromechanical Syst.*, vol. 25, No. 1 (2016), pp. 69-77.
Feng et al., "Towards autonomous robotic in-situ assembly on unstructured construction sites using monocular vision," presentation from the *31th Int. Symp. on Autom. and Robot. in Construction* (2014), pp. 1-42.
H. Jiang et al., "A robotic device using gecko-inspired adhesives can grasp and manipulate large objects in microgravity," *Sci. Robot.*, vol. 2, No. 7 (2017) pp. 1-11.
Keum et al., "Microassembly of Heterogeneous Materials using Transfer Printing and Thermal Processing," Scientific Rep., vol. 6, No. 29925 (2016) pp. 1-9.
Kim, "Micro-LEGO for MEMS," *Micromachines*, vol. 10, No. 267 (2019) p. 1-24.
Lourenço et al., "On the design of the Robo-Partner Intra-factory Logistics Autonomous Robot," in *IEEE Int. Conf. on Syst., Man, Cybern.*, Budapest, (2016), pp. 2647-2652.
Linghu et al., "Universal SMP gripper with massive and selective capabilities for multiscaled, arbitrarily shaped objects," *Science Advances*, vol. 6 (2020) pp. 1-11.
Minsky et al., "Composite Microposts with High Dry Adhesion Strength," *ACS Appl. Mater. & Interfaces*, vol. 9, No. 21 (2017) pp. 18322-18327.
Miyake et al., "Vacuum-based wet adhesion system for wall climbing robots-lubricating action and seal action by the liquid," in *Proceedings of the 2008 International Conference on Robotics and Biomimetrics*, Bangkok, Thailand (2009) pp. 1824-1829.
Nonaka et al., "Open loop oscillatory control for electromagnetic actuated microgrippers," *SICE 2004 Annual Conf.*, vol. 3, (2004) pp. 2285-2290.
Park et al., "Reversible Underwater Dry Adhesion of a Shape Memory Polymer," *Adv. Mater. Interfaces*, vol. 6, No. 3, (2018) pp. 1801542-1 to 1801542-8.
Parness et al., "Gravity-independent mobility and drilling on natural rock using microspines," in *Robot. and Autom. (ICRA), 2012 IEEE Int. Conf. on.* IEEE (2012) pp. 3437-3442.
Parness et al., "Gravity-independent Rock-climbing Robot and a Sample Acquisition Tool with Microspine Grippers," *J. of Field Robotics*, vol. 30, No. 6 (2013) pp. 897-915.
Ruggeri et al, "Micro-robotic Handling Solutions for PCB (re-)manufacturing," *Procedia Manuf.*, vol. 11 (2017) pp. 441-448.
Rus et al., "Design, fabrication and control of soft robots," Nature, vol. 521, No. 7553 (2015) pp. 467-475.
Shintake et al., "Versatile Soft Grippers with Intrinsic Electroadhesion Based on Multifunctional Polymer Actuators," in *Adv. Mater.*, vol. 28, No. 2 (2016) pp. 231-238.
Song et al., "Controllable load sharing for soft adhesive interfaces on three-dimensional surfaces", *Proc. of the Nat. Academy of Sci.*, vol. 114, No. 22 (2017) pp. E4344-E4353.
Song et al., "Geckogripper: A soft, inflatable robotic gripper using gecko-inspired elastomer micro-fiber adhesives," *2014 IEEE/RSJ International Conference on Intelligent Robots and Systems (IROS 2014)*, Chicago, IL (2014), pp. 4624-4629.
Stoyanov et al., "No More Heavy Lifting: Robotic Solutions to the Container Unloading Problem," *IEEE Robot. Autom. Mag.*, vol. 23, No. 4 (2016) pp. 94-106.
Telegenov et al., "A Low-Cost Open-Source 3-D-Printed Three-Finger Gripper Platform for Research and Educational Purposes," *IEEE Access*, vol. 3 (2015) pp. 638-647.
Zhang et al., "Sky cleaner 3: A real pneumatic climbing robot for glass-wall cleaning," *IEEE Robot. Autom. Mag.*, vol. 13, No. 1 (2006) pp. 32-41.

* cited by examiner

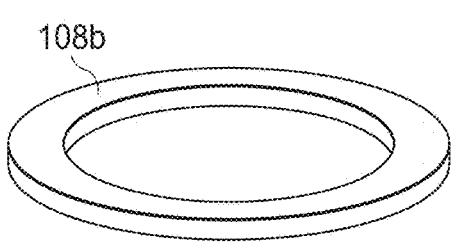
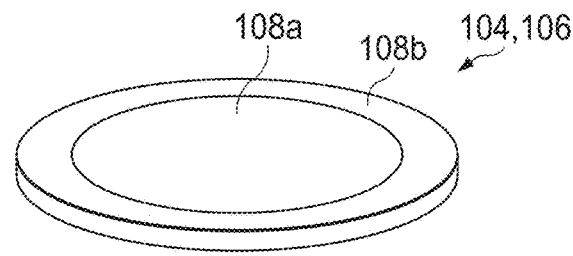
FIG. 7A    FIG. 7B
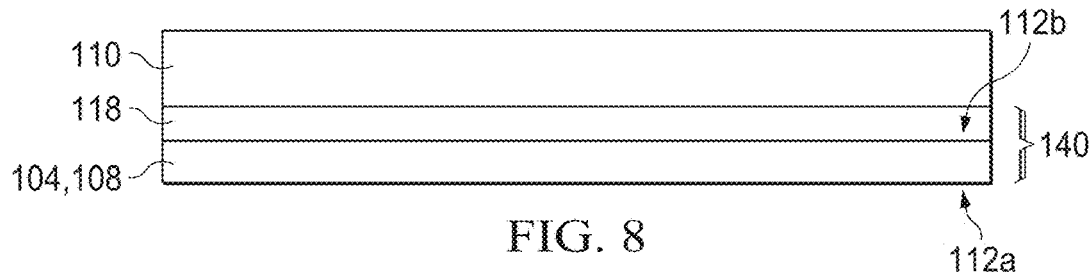
FIG. 8
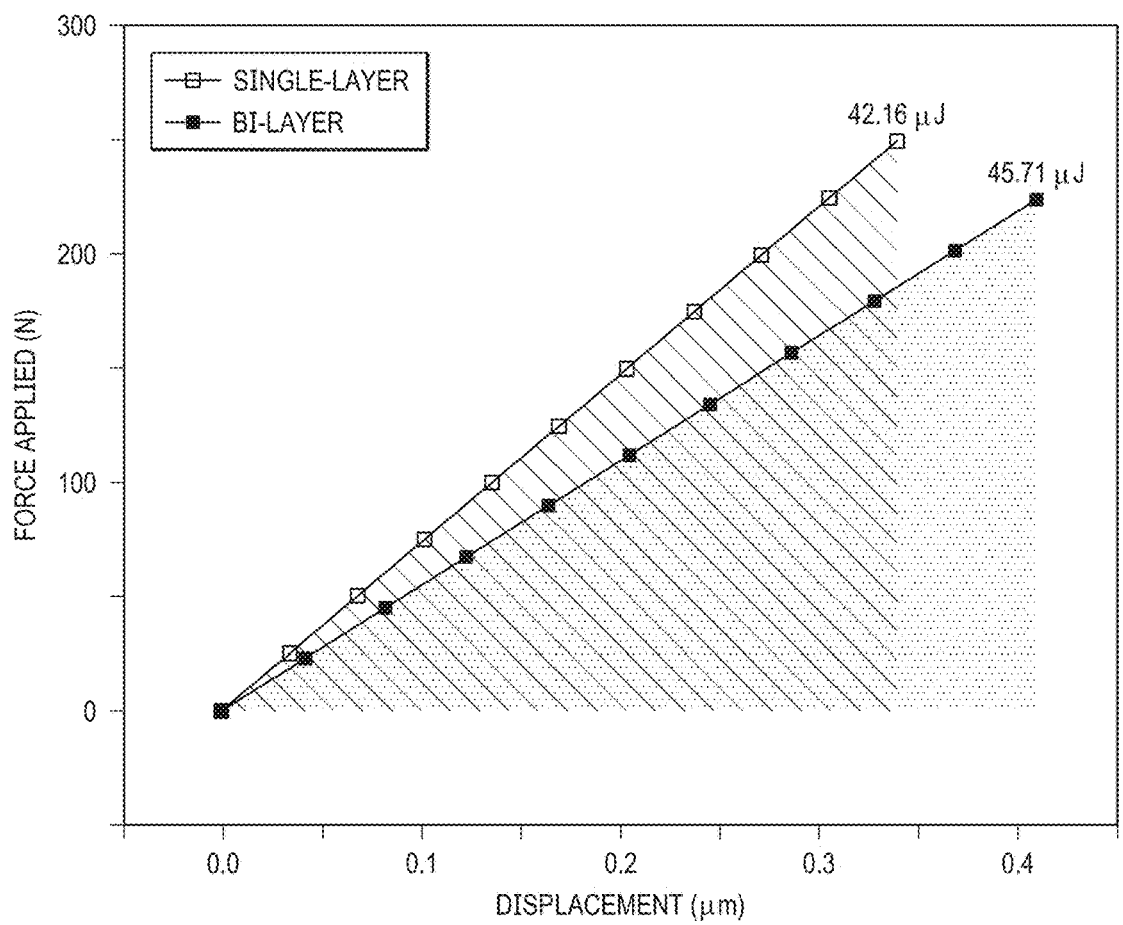
FIG. 9

ADHESIVE GRIPPER COMPRISING A SHAPE MEMORY POLYMER FOR PICK-AND-PLACE APPLICATIONS

RELATED APPLICATIONS

The present patent document claims the benefit of priority under 35 U.S.C. § 119(e) to U.S. Provisional Patent Application No. 63/027,061, which was filed on May 19, 2020, and is hereby incorporated by reference in its entirety.

TECHNICAL FIELD

The present disclosure is related generally to shape memory polymer adhesives and more particularly to a gripper comprising a shape memory polymer.

BACKGROUND

Robotic grippers have highly been explored for numerous applications in diverse fields. The aerospace industry may require gravity-independent or zero-gravity grippers to use in space. Electronics companies may employ pick-and-place robotic grippers to assemble devices using surface mounting technologies. The manufacturing or logistics industry also has a strong demand for grippers to lift heavy objects or to do repetitive manipulations that lessen the burden of human workers. Microassembly utilizing grippers may enable unique three-dimensional microelectromechanical systems (MEMS) that cannot be achieved using other conventional approaches.

In an effort to satisfy the aforementioned demands, various mechanisms for robotic grippers have been introduced. Finger grippers may be simple yet effective when optimized by choosing the number of fingers and the shape of their gripping motions with appropriate actuation methods, and soft grippers show favorable performance since they resemble real human fingers. However, both finger and soft grippers have a common drawback, in that the target objects they lift must have multiple surfaces with acceptable dimensions to be gripped. Using microspine grippers may be a great choice to interact with rough surfaces such as rocks, but they may not be capable of working with smooth surfaces. While electromagnetic grippers have a benefit of easy and fast lifting and releasing, they are limited to lifting objects made of ferrous materials. Electroadhesion grippers based on electrostatic forces may be beneficial for quick pick-and-place due to their fast response speed; however, their adhesion strength is relatively low unless the voltage is very high, which may result in damage to electronic parts on adhering surfaces. Vacuum grippers are capable of lifting heavy weight objects and they can also be used for wall-climbing, but they are ineffective in a vacuum or with porous objects. More recent gecko grippers have limited adhesion strength, working only for dry surfaces, and they have somewhat complicated manufacturing and/or operation that may suppress their broader adaptation.

BRIEF SUMMARY

A foot of an adhesive gripper for pick-and-place maneuvers, an adhesive gripper, and a method of using the adhesive gripper for pick-and-place maneuvers are described in this disclosure.

According to a first embodiment, the foot includes a SMP dry adhesive having a dual structure comprising a first shape memory polymer having a first stiffness and a second shape memory polymer having a second stiffness, where the first stiffness is higher than the second stiffness. The foot includes a rigid backing layer attached to a back side of the SMP dry adhesive such that a front side of the SMP dry adhesive is available for attachment and release of objects.

According to a second embodiment, the foot includes a SMP dry adhesive comprising a shape memory polymer and having a front side for the attachment and detachment of objects, where the shape memory polymer has a first stiffness. The foot includes a soft polymer layer on a back side of the SMP dry adhesive and a rigid backing layer attached to the soft polymer layer, which has a second stiffness less than the first stiffness.

An adhesive gripper for pick-and-place maneuvers comprises one or more legs, where each leg terminates in a foot rotatably connected to the respective leg. Each foot includes a SMP dry adhesive comprising a shape memory polymer, and a rigid backing layer attached to a back side of the SMP dry adhesive, such that a front side of the SMP dry adhesive is available for attachment and release of objects. The adhesive gripper further includes a handle portion connected to the one or more legs, a release mechanism comprising a release ring within the handle portion, and one or more releasing rods integrated with the one or more legs for release of an object onto a substrate.

The method of using the adhesive gripper for a pick-and-place maneuver includes: engaging the handle portion to move the adhesive gripper to a pick-up position where at least one foot is in contact with an object; heating the SMP dry adhesive of the at least one foot above a glass transition temperature thereof, thereby transitioning the shape memory polymer to a rubbery state, and applying a pressing force to the handle portion, thereby compressing the SMP dry adhesive from an undeformed configuration to a deformed configuration while in contact with the object; cooling the SMP dry adhesive, thereby transitioning the shape memory polymer to a glassy state and binding the object to the SMP dry adhesive in the deformed configuration; engaging the handle portion to pick up and move the object bound to the SMP dry adhesive to a desired position for placement onto a substrate; and heating the SMP dry adhesive above the glass transition temperature to induce a return to the undeformed configuration while applying a pulling force to the release ring to press the one or more releasing rods into the substrate, thereby releasing the object bound to the SMP dry adhesive onto the substrate.

BRIEF DESCRIPTION OF THE DRAWINGS

FIG. 7A shows a step in preparing a SMP dry adhesive having a dual structure, and FIG. 7B shows the final dual-structure SMP dry adhesive.

FIG. 8 shows a cross-sectional schematic of a SMP dry adhesive that includes a soft polymer layer on a back side thereof, between the SMP dry adhesive and the rigid backing layer.

FIG. 9 shows simulated adhesion force as a function of displacement of a rigid backing layer when combined with a single layer (SMP dry adhesive only) and when combined with a bilayer comprising a soft polymer layer and a SMP dry adhesive.

DETAILED DESCRIPTION

In this disclosure, a shape memory polymer (SMP) dry adhesive that exhibits strong, material-independent, reversible, and dry adhesion for picking and placing flat, smooth or moderately rough objects is employed for an adhesive gripper. The dry adhesion is effective for dry, wet and/or submerged objects. The unique adhesive properties of the SMP dry adhesive can eliminate or mitigate the shortcomings of existing grippers. The adhesive gripper and a method of using the adhesive gripper for pick-and-place maneuvers are described in detail in this disclosure.

Figure 1:
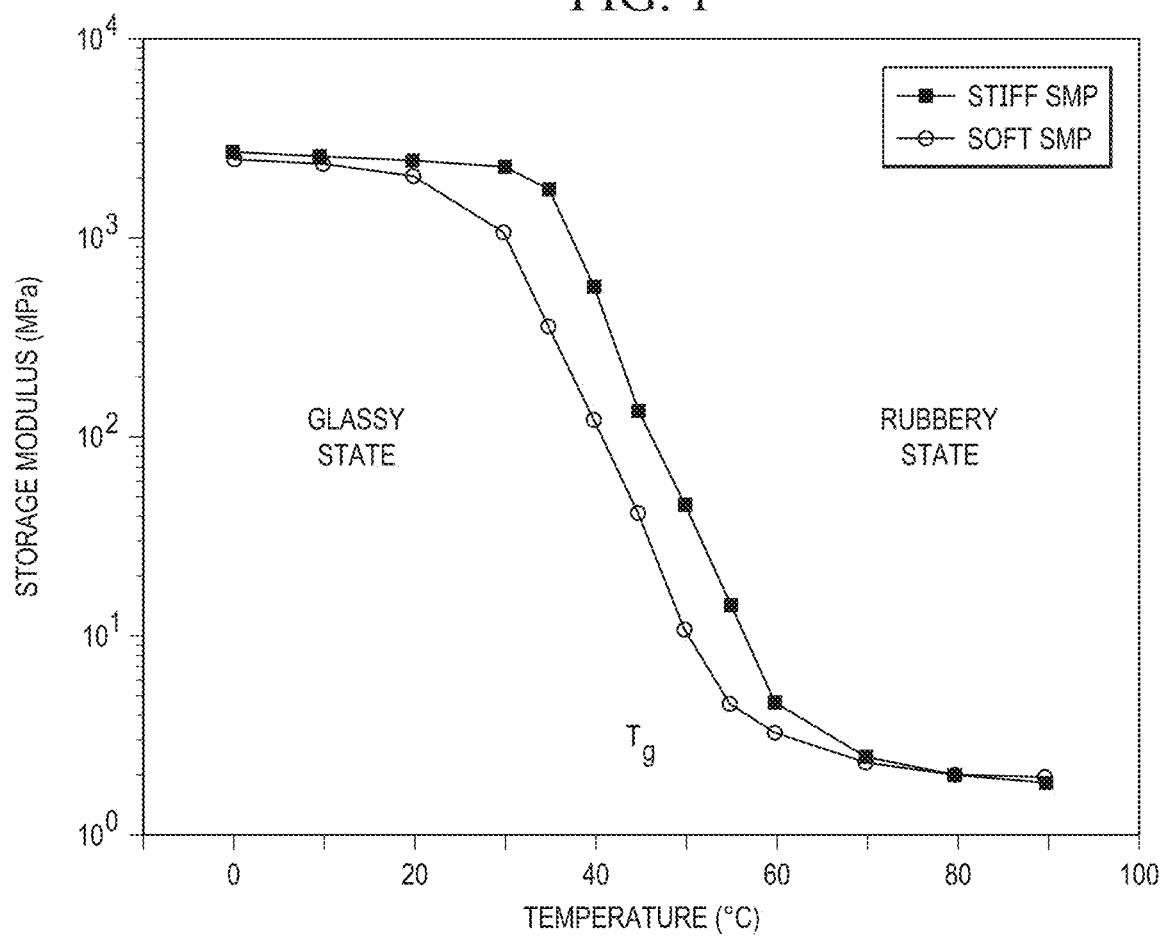
FIG. 1 is a plot showing storage moduli of exemplary stiff and soft shape memory polymers (SMPs) as a function of temperature.

Before the SMP dry adhesive and its use in an adhesive gripper are described in detail, the beneficial characteristics and behavior of SMPs are explained. SMPs comprise a class of external stimuli-responsive polymers that exhibit the shape memory effect, which may be described as an ability to stably fix a deformed or "temporary" shape and fully recover an original or "permanent" shape. In particular, a thermoresponsive SMP undergoes a substantial change in storage modulus across the glass transition temperature ($T_g$) between glassy and rubbery states, as illustrated in FIG. 1, and generally shows a strong shape memory effect upon thermomechanical loading. With applied heat and pressure, a SMP may become soft in its rubbery state and make a conformal and hermetic contact with a dry or wet opposing surface. In its rubbery state at an elevated temperature, the SMP adhesive is flexible and may easily conform to an adherend upon application to the surface. The conformability may be macroscopically apparent, such as in the case of a curved or otherwise non-flat surface, while also occurring on the molecular level, where intermolecular forces (e.g., van der Waals forces) generate a strong net adhesion between the SMP and the surface. After cooling with pressure, the SMP may become rigid in its glassy state yet maintain contact with the opposing surface, with which the SMP forms a strong dry adhesion. In its rigid temporary state, conformed to the adherend, the SMP may be strongly and stably bonded and may not be easily removed.

Heating the SMP above its $T_g$ may return the SMP to its rubbery state, at which point the SMP may be easily peeled or otherwise removed from the surface. Above the $T_g$, the strong adhesion is reduced and the SMP tends to lose contact, allowing for release of the adherend and consequently reversible dry adhesion. Under stress free conditions, while in its rubbery state, the SMP can additionally return to its original permanent shape. The adhesive SMP surface is not adversely affected during this process since the adhesion is entirely dry adhesion; in other words, a consumable layer of tacky adhesive is not required. FIG. 1 depicts the storage moduli of exemplary SMPs as a function of temperature. The storage moduli are measured using TA instrument Q800 Dynamic Mechanical Analysis. Typically, the glass transition encompasses a range of temperatures, as opposed to a single temperature, and thus the glass transition temperature $T_g$ may be referred to as a glass transition temperature zone $T_g$. At room temperature, which is normally below the $T_g$, the SMP is not tacky and is therefore resistant to surface contamination.

Figure 2:
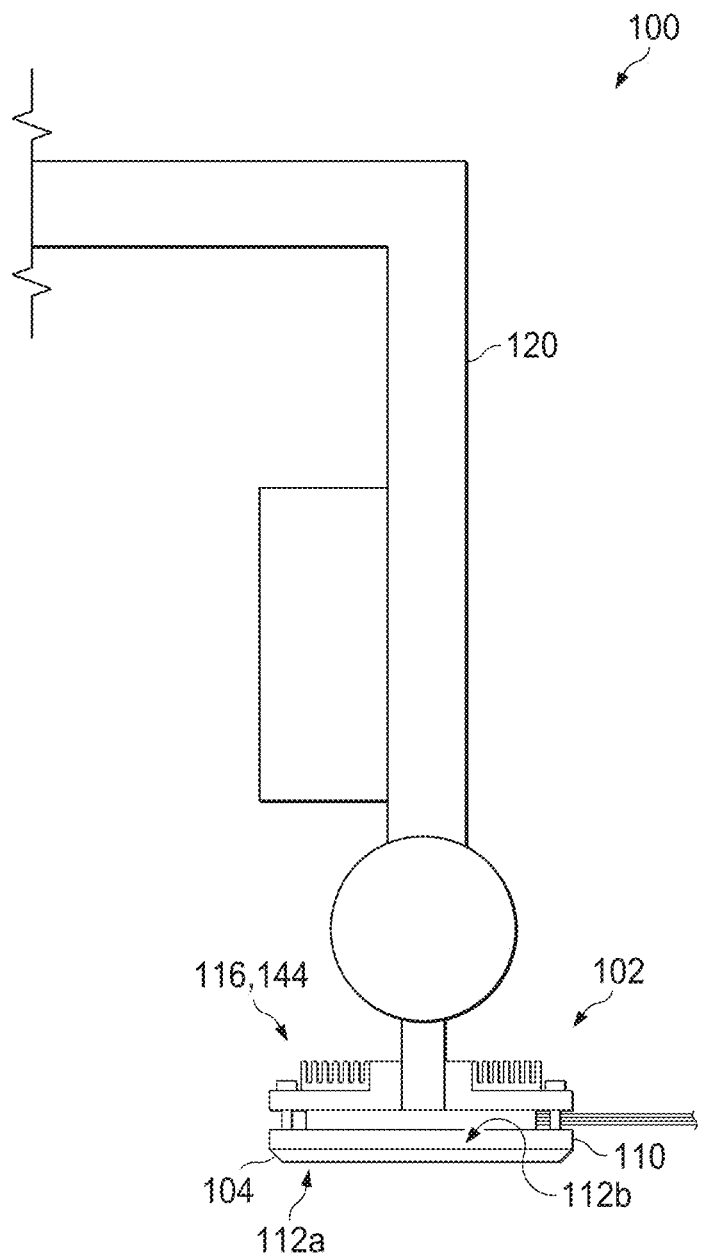
FIG. 2 provides a schematic of a foot of an adhesive gripper for pick-and-place maneuvers.
Figure 3A:
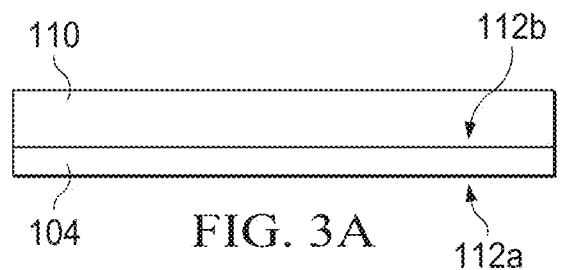
FIG. 3A shows a cross-sectional schematic and FIG. 3B shows a front side (or bottom view) of a SMP dry adhesive having a dual structure.

FIG. 2 provides a schematic of a foot 102 of an adhesive gripper 100 for pick-and-place maneuvers. The foot 102 includes a SMP dry adhesive 104, which is illustrated according to a first embodiment in FIGS. 3A and 3B. The SMP dry adhesive 104 has a dual structure 106 comprising a first shape memory polymer 108a having a first stiffness and a second shape memory polymer 108b having a second stiffness, where the first stiffness is higher than the second stiffness. A rigid backing layer 110 is attached to a back side 112b of the SMP dry adhesive, and a front side 112a of the SMP dry adhesive 104 is available for attachment and release of objects, as shown in the schematic FIG. 3A. The dual structure 106 is illustrated according to one embodiment in FIG. 3B, where the first shape memory polymer 108a is disposed at the center of the front side 112a and the second shape memory polymer 108b is disposed about a perimeter. The dual structure 106 of the SMP dry adhesive 104—in comparison with a simple "single" structure—allows for a more even distribution of stress at the adhesive interface, potentially resulting in retarded contact failure and enhanced adhesion strength, as substantiated by data discussed below.

Figure 4:
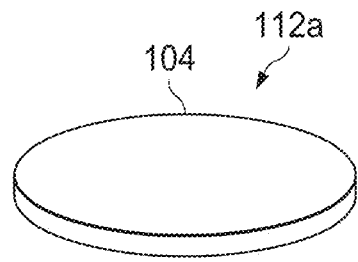
FIG. 4 shows a SMP dry adhesive having a planar adhesion surface.
Figure 5:
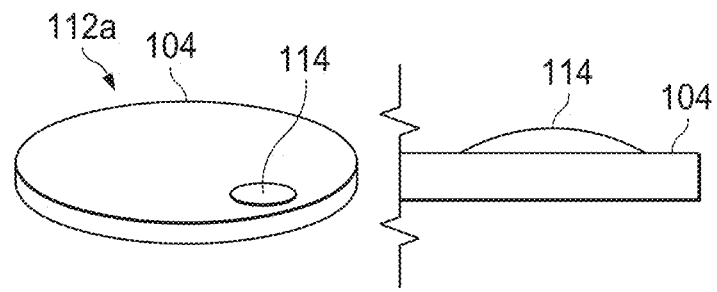
FIG. 5 shows a SMP dry adhesive having a nonplanar adhesion surface.

The front side 112a of the SMP dry adhesive 104 may comprise a planar adhesion surface, as shown in FIG. 4. Alternatively, it may be advantageous for the front side 112a of the SMP dry adhesive 104 to comprise a nonplanar adhesion surface. For example, as illustrated in FIG. 5, the nonplanar adhesion surface may include one or more bumps (or "release tips") 114 to facilitate release of an attached object. Combining the dual structure 106 of the SMP dry adhesive 104 with the nonplanar adhesion surface (e.g., the release tip(s) 114) may provide multiple benefits, such as increasing the maximum adhesion strength while the SMP dry adhesive is in the glassy state and decreasing the requisite peeling force while the SMP drive adhesive is in the rubbery state.

Figure 6:
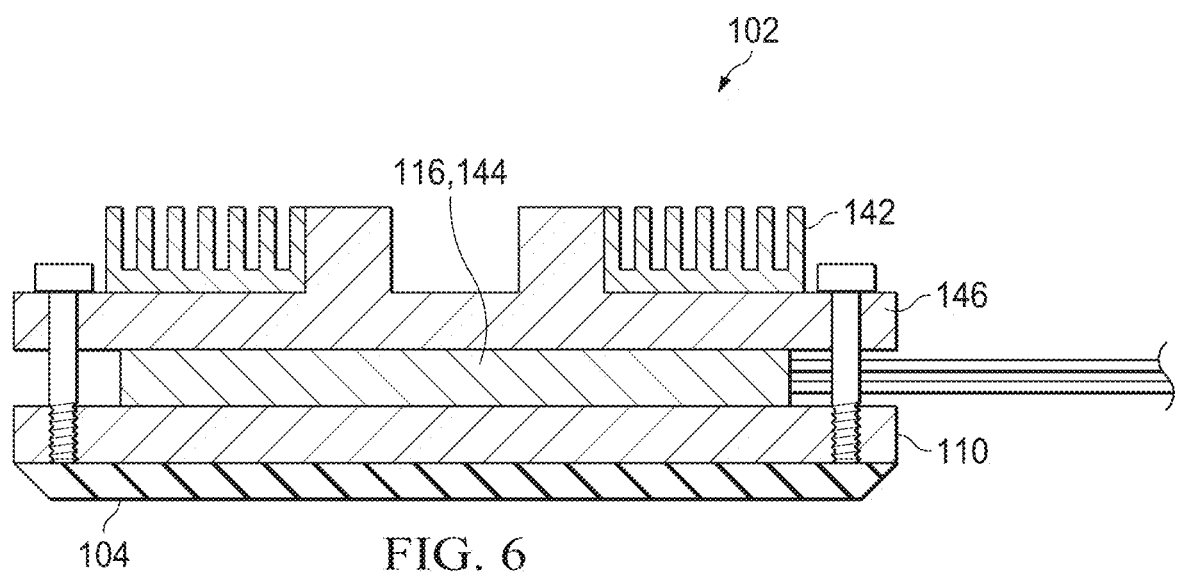
FIG. 6 shows a schematic of an exemplary heating and/or cooling mechanism, in particular, a Peltier module, attached to a rigid backing layer of a SMP adhesive.

The rigid backing layer 110 may be in contact with a heating and/or cooling mechanism 116, as shown in FIG. 2. Accordingly, the rigid backing layer 110 may comprise a thermally conductive material, such as a metal (e.g., aluminum). FIG. 6 provides a more detailed schematic of an exemplary heating and/or cooling mechanism 116 secured to the rigid backing layer 110. In this example, the heating and/or cooling mechanism 116 comprises a thermoelectric module, such as a Peltier module 144. As shown, the Peltier module 144 may be in contact with a thermally conductive backing plate 146 that includes fins 142 to release excess heat.

FIG. 7B provides a perspective view of an exemplary SMP dry adhesive 104 having a dual structure 106. As shown, the first shape memory polymer 108a having the first stiffness may be disposed at a center of the SMP dry adhesive 104 and the second shape memory polymer 108b having the second (lower) stiffness may be disposed along a perimeter of the SMP dry adhesive 104. The SMP dry adhesive 104 may have a shape of a film, plate or disk.

To prepare the SMP dry adhesive 104 having the dual structure 106, the second shape memory polymer 108b having the lower stiffness may be prepared and cured, and cut into a ring shape, as shown in FIG. 7A. Suitable monomer(s) to form the first shape memory polymer 108a may then be deposited inside the ring-shaped first shape memory polymer 108a and cured, thereby forming the dual structure 106 shown in FIG. 7B. Advantageously, the first stiffness of the first shape memory polymer 108a may be at least about 1.5 times higher than the second stiffness of the second shape memory polymer 108b, and in some cases, the first stiffness may be at least about two times higher than the second stiffness.

The difference in stiffness may be obtained by manipulating the ratio of component monomers during fabrication of the shape memory polymers 108a,108b. For example, the first shape memory polymer 108a may be prepared from a mixture of a first monomer, a second monomer, and a curing agent in a weight-based first mixing ratio, and the second shape memory polymer may be prepared from a mixture of the first monomer, the second monomer, and the curing agent in a weight-based second mixing ratio, and where the first mixing ratio and the second mixing ratio are different. For example, the first weight ratio may be about 0.9:1:0.8, and the second weight ratio may be about 0.3:1:0.7. More generally, the first weight ratio may lie in the ranges 0.8-1.0:0.9-1.1:0.7-0.9, and the second weight ratio may lie in the ranges 0.2-0.4:0.9-1.1:0.6-0.8. In some examples, the first monomer may comprise an epoxy monomer of a first molecular weight and the second monomer may comprise an epoxy monomer of a second molecular weight.

To prepare the SMP dry adhesive 104 having a nonplanar adhesion surface as shown in FIG. 5, a SMP having a suitable stiffness may be formed or cut into a round or other desired shape, and a single drop of a SMP precursor may be applied to the surface of the SMP and then cured, thereby forming a release tip 114 on the SMP dry adhesive 104. If desired, multiple drops may be applied at various locations of the surface to form multiple release tips 114 upon curing.

The SMP adhesive 104 for the foot 102 of the adhesive gripper 100 shown in FIG. 2 is illustrated according to a second embodiment in FIG. 8. In this example, the SMP dry adhesive 104 comprises a shape memory polymer 108, such as the first shape memory polymer 108a described above, which has a first stiffness. A front side 112a of the SMP dry adhesive 104 is available for the attachment and detachment of objects. A soft polymer layer 118 having a second stiffness less than the first stiffness is positioned on a back side 112b of the SMP dry adhesive 104, and a rigid backing layer 110 is attached to the soft polymer layer 118. The soft polymer layer 118 together with the SMP dry adhesive 104 may be described as a bilayer 140.

The soft polymer layer 118 can absorb energy and may allow the foot 102 to behave in an elastic and/or dissipative manner. Due to the energy absorption and damping effect of the soft polymer layer 118, a larger work of adhesion may be obtained. The simulation result in FIG. 9 shows adhesion force as a function of displacement of the rigid backing layer 110 when combined with a single layer (SMP dry adhesive 104 only) and when combined with the bilayer 140 comprising the soft polymer layer 118 and the SMP dry adhesive 104. Although the maximum force is decreased when employing the bilayer, the work of adhesion, which corresponds to the area under the curve, is shown to be improved by about 8%. It can be concluded that adding the soft polymer layer 118 sacrifices some amount of maximum adhesion force but has a benefit in increasing the total adhesion energy. As in the previous embodiment, the SMP dry adhesive 104 may have the shape of a film, plate or disk. The front side 112a of the SMP dry adhesive may comprise a planar adhesion surface, as shown in FIG. 8, or a nonplanar adhesion surface including, for example, one or more release tips 114 as described above to facilitate the release of attached objects.

Figure 3B:
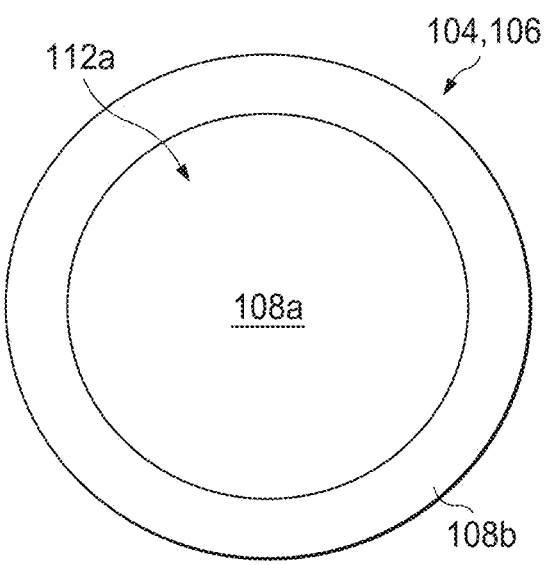

The shape memory polymer 108,108a may be prepared from a mixture comprising a first monomer, a second monomer, and a curing agent, as described above, where the first monomer may comprise an epoxy monomer of a first molecular weight and the second monomer may comprise an epoxy monomer of a second molecular weight. The soft polymer layer 118 may comprise an elastomer or a shape memory polymer. In some examples, the SMP dry adhesive 104 may have a dual structure 106, as described above. In such a case, the SMP dry adhesive 104 may include the shape memory polymer 108a having the first stiffness and may further comprise a second shape memory polymer 108b having a third stiffness, where the first stiffness is higher than the third stiffness. The shape memory polymer 108a may be disposed at a center of the SMP dry adhesive and the second shape memory polymer 108b may be disposed along a perimeter of the SMP dry adhesive 104, as shown in FIG. 3B. The second shape memory polymer 108b may have a composition as described above.

Referring again to FIG. 8, the rigid backing layer 110 may be in contact with a heating and/or cooling mechanism, as described above. Accordingly, the rigid backing layer 110 may comprise a thermally conductive material, such as a metal (e.g., aluminum). FIG. 6 provides a detailed schematic showing an embodiment of the foot 102 in which a heating and/or cooling mechanism 116 is secured to the rigid backing layer 110. The heating and/or cooling mechanism 116 may comprise a thermoelectric module, such as a Peltier module 144 as shown, and heat-releasing fins 142 may be employed on a backside of the module 144 to promote cooling.

Figure 10A:
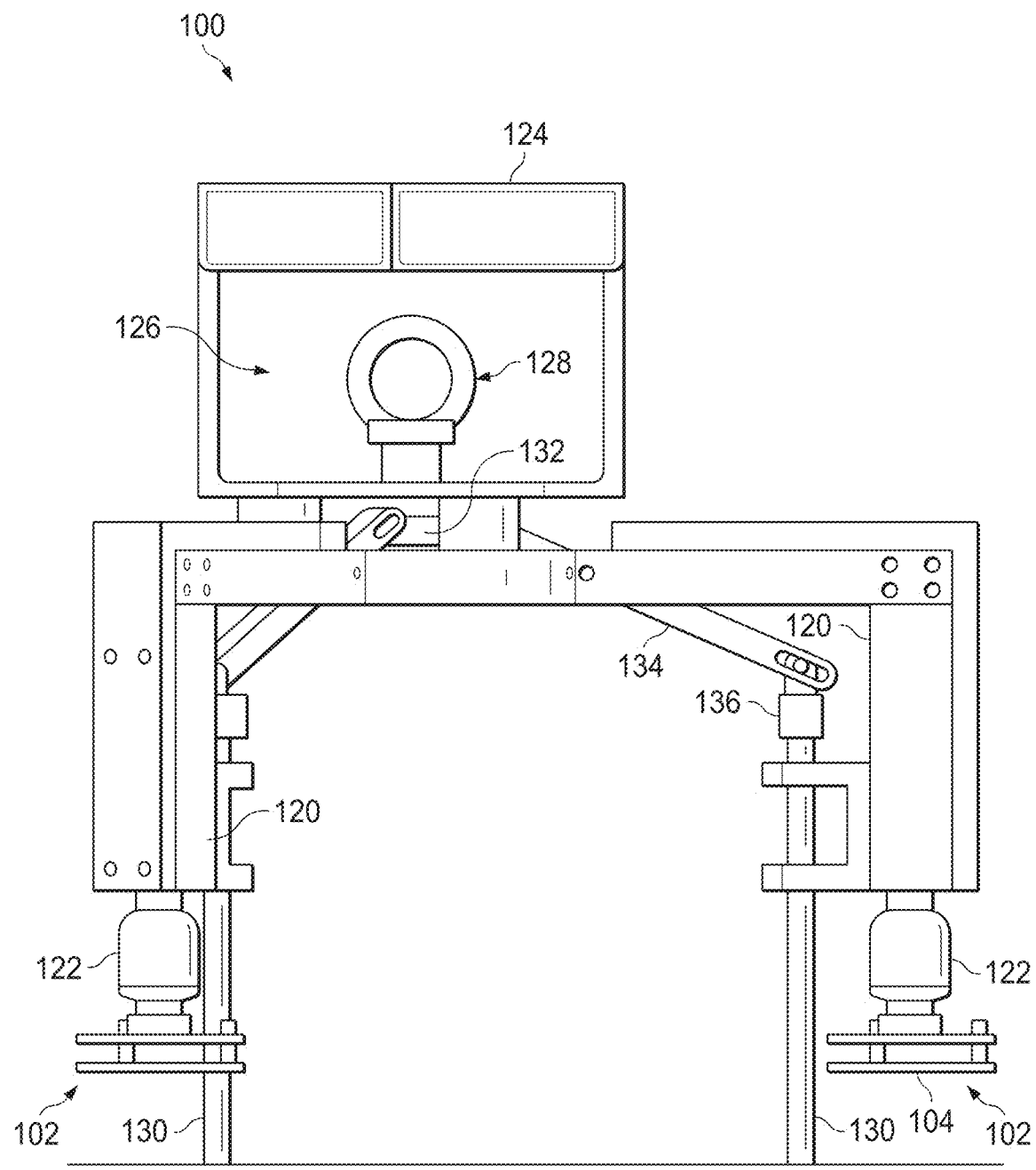
FIGS. 10A and 10B show an adhesive gripper positioned for releasing and picking up ("picking") an object, respectively.
Figure 10B:
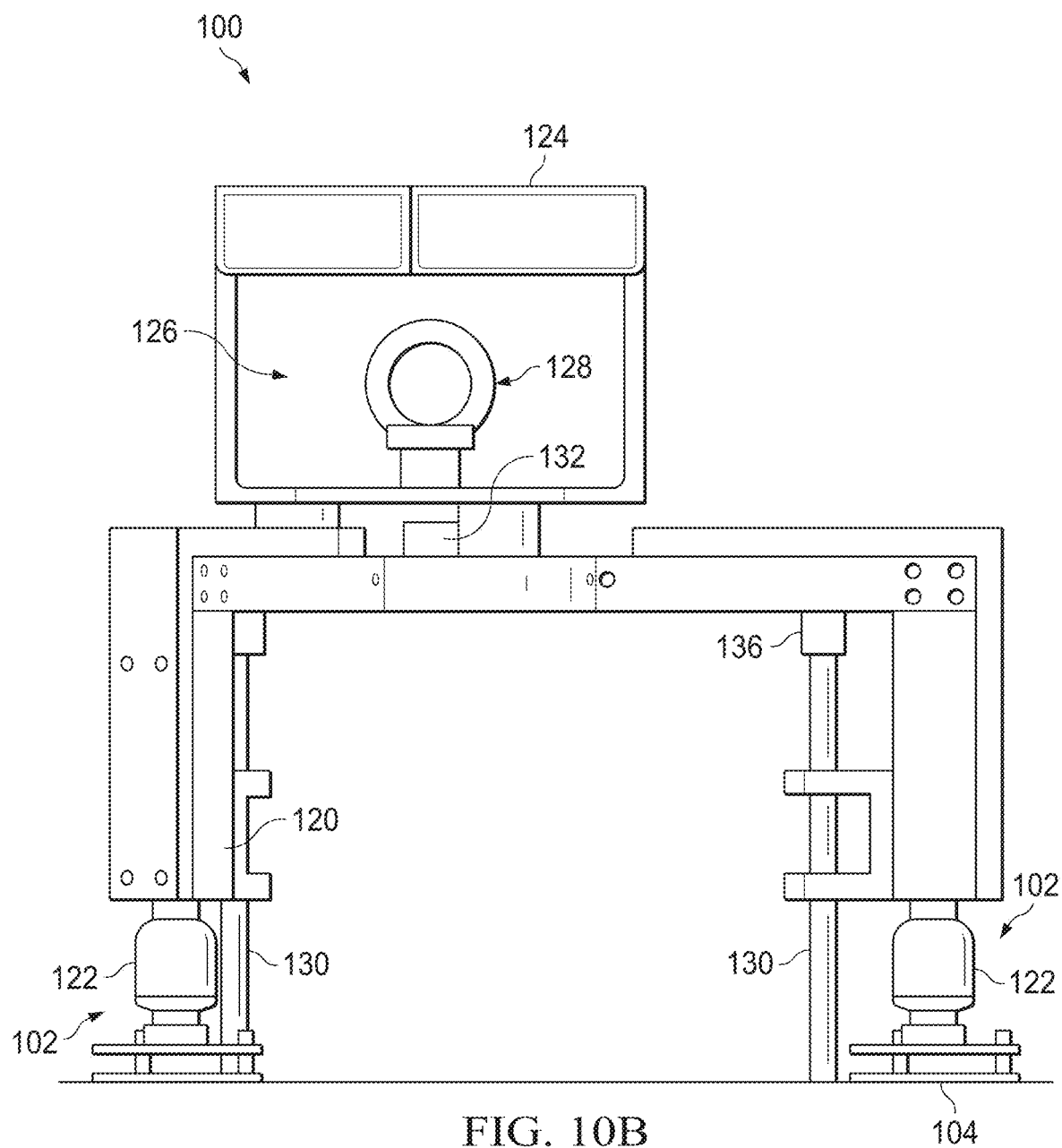

Referring now to FIGS. 10A and 10B, an adhesive gripper 100 for pick-and-place maneuvers is also described in this disclosure. The adhesive gripper 100 includes one or more legs 120, where each leg 120 terminates in a foot 102 rotatably connected to the respective leg 120 (e.g., by a ball joint 122). Typically, the adhesive gripper 100 includes three or four legs 120, but may include any desired number (e.g, up to eight, or more). Each foot 102 of the adhesive gripper 100 includes a SMP dry adhesive 104 comprising a shape memory polymer 108, and a rigid backing layer 110 attached to a back side 112*b* of the SMP dry adhesive 104, such that a front side 112*a* of the SMP dry adhesive 104 is available for attachment and release of objects, as described above in reference to FIG. 2. The rigid backing layer 110 may be the directly attached to the back side 112*b* of the SMP dry adhesive 104 or attached to an intervening layer, such as the soft polymer layer 118 described above in reference to FIG. 8. Each foot 102 and the SMP dry adhesive 104 may have any of the characteristics and/or properties described above or elsewhere in this disclosure.

The adhesive gripper 100 also includes a handle portion 124 connected to the one or more legs 120, and a release mechanism 126, as shown in FIGS. 10A and 10B. The release mechanism 126 comprises a release ring 128 within the handle portion 124 and one or more releasing rods 130 integrated with the one or more legs 120 for release of an object onto a substrate. Each of the one or more releasing rods 130 may be slidingly connected to the respective leg 120, as shown by comparing FIGS. 10A and 10B. A pulling force applied to the release ring 128 may be transferred to the one or more releasing rods 130 as a force directed into the substrate (e.g., floor or other supporting surface), thereby facilitating release of the object.

A prototype has been constructed and tested for pick-and-place maneuvers, as shown in the schematics of FIGS. 11A-11E. The exemplary constructed SMP adhesive gripper 100 has three legs 120, three feet 102, and three releasing rods 130. The legs 120 and feet 102 are connected using ball joints 122 with a maximum swivel angle of 35°. The force applied to the release ring 128 is transferred to the releasing rods 130 via the top, middle and bottom links 132,134,136 (see FIGS. 10A and 10B). Pin-in-slot joints 150 as shown in FIG. 12 are used to connect the middle link 134 and both top and bottom links 132,136. The SMP adhesive gripper 100 may be constructed, in one example, with machined aluminum and 3D printed parts. The gripper 100 may include a battery and a thermocouple for heating/cooling and temperature sensing. The three feet 102 may be connected in parallel to an 11.1 V, 1200 mAh Lithium polymer (LiPo) battery (Kinexsis). Wires between the feet 102 and the external lead of the gripper 100 may be concealed inside aluminum frames. Three Peltier modules 144 may be in thermal contact with the three SMP dry adhesives 104 (one module 144 per foot 102) and utilized for heating/cooling cycles. For example, to control the Peltier modules 144 by switching electrical polarity and thus the direction of current flow, a double-pole, double-throw (DPDT) switch (e.g., 15 ampere maximum) with "center position off" may be used.

Figure 11A:
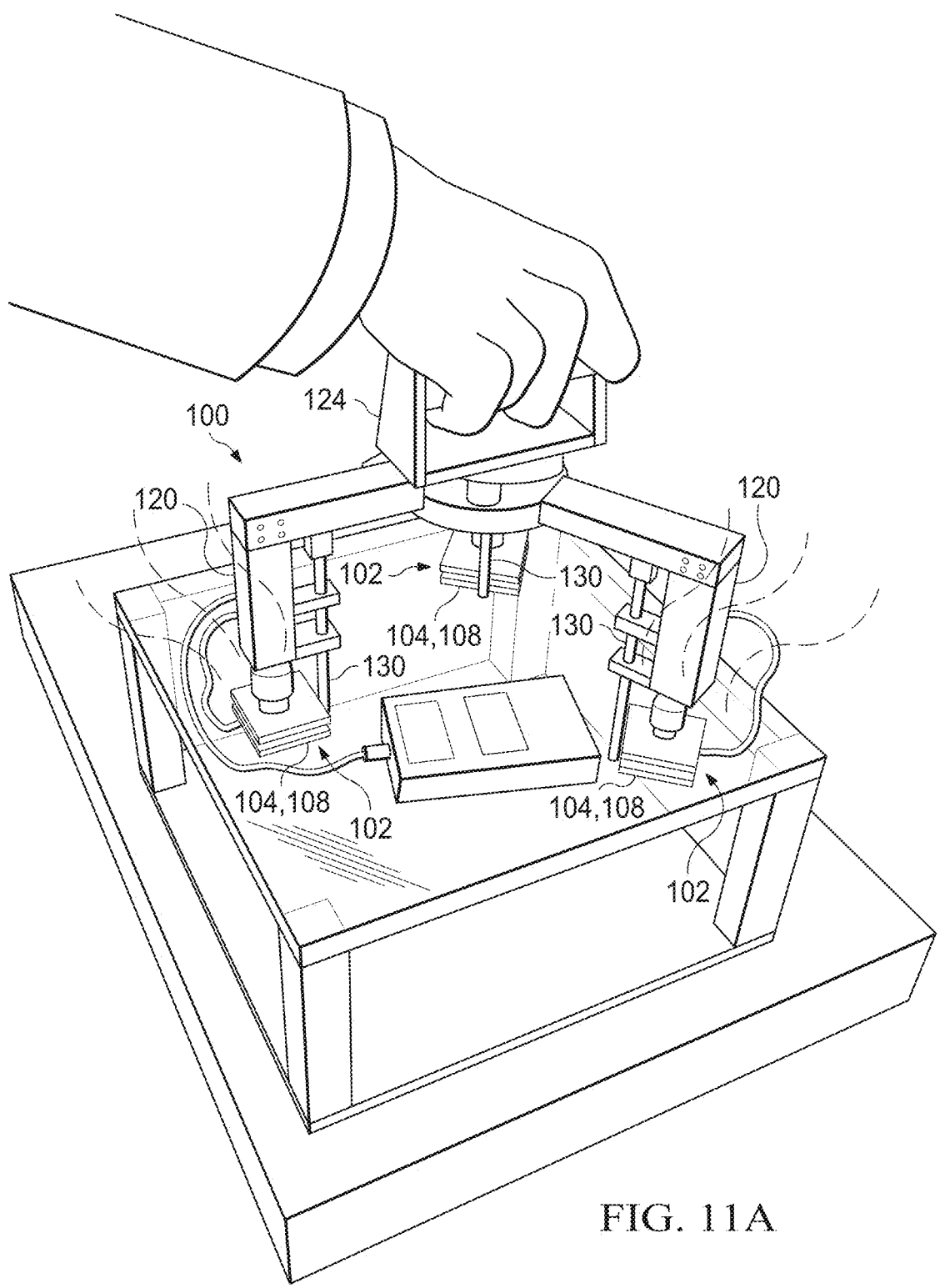
FIGS. 11A-11E illustrate a method of using the adhesive gripper for a pick-and-place maneuver.
Figure 11B:
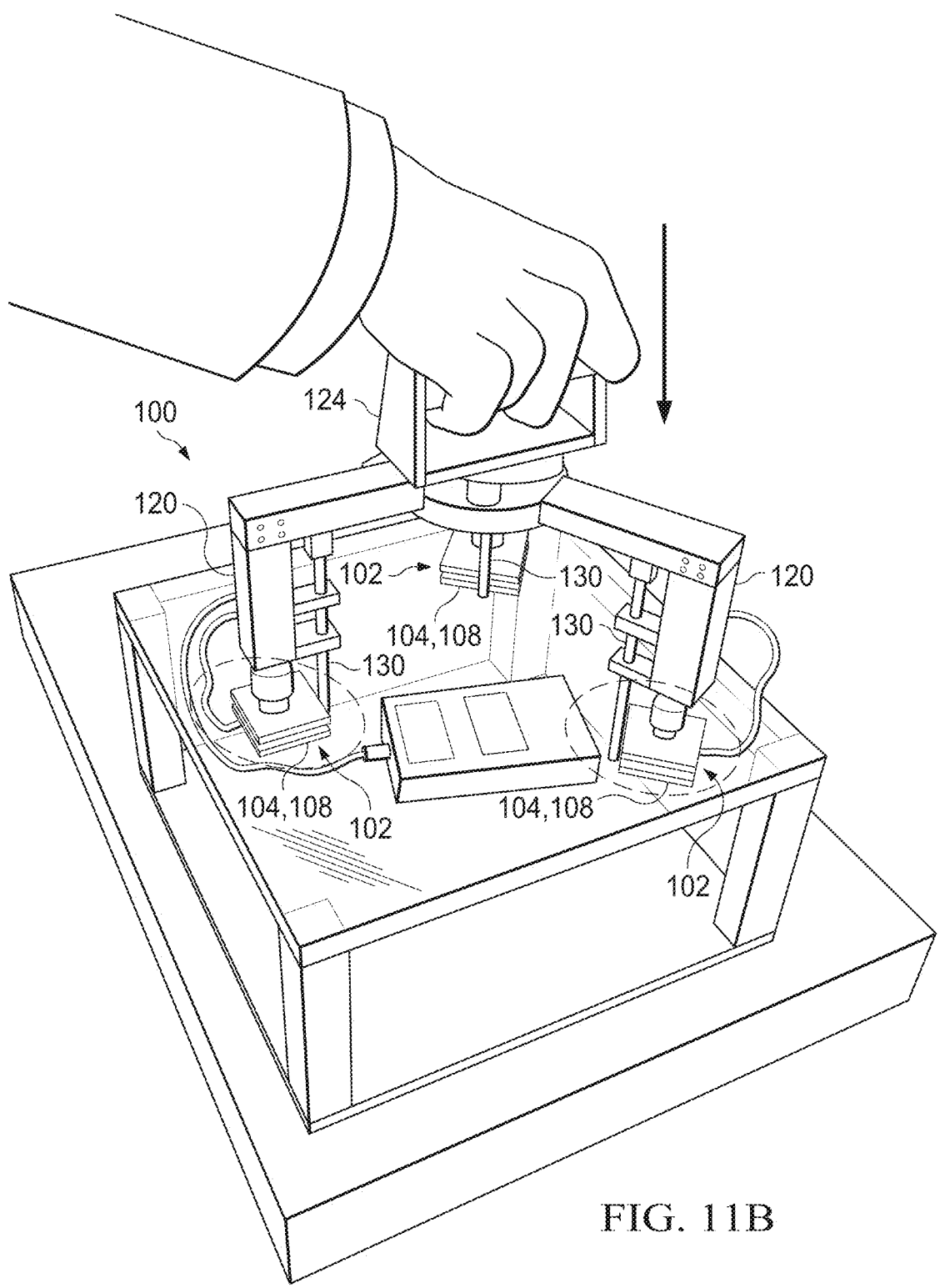
Figure 11C:
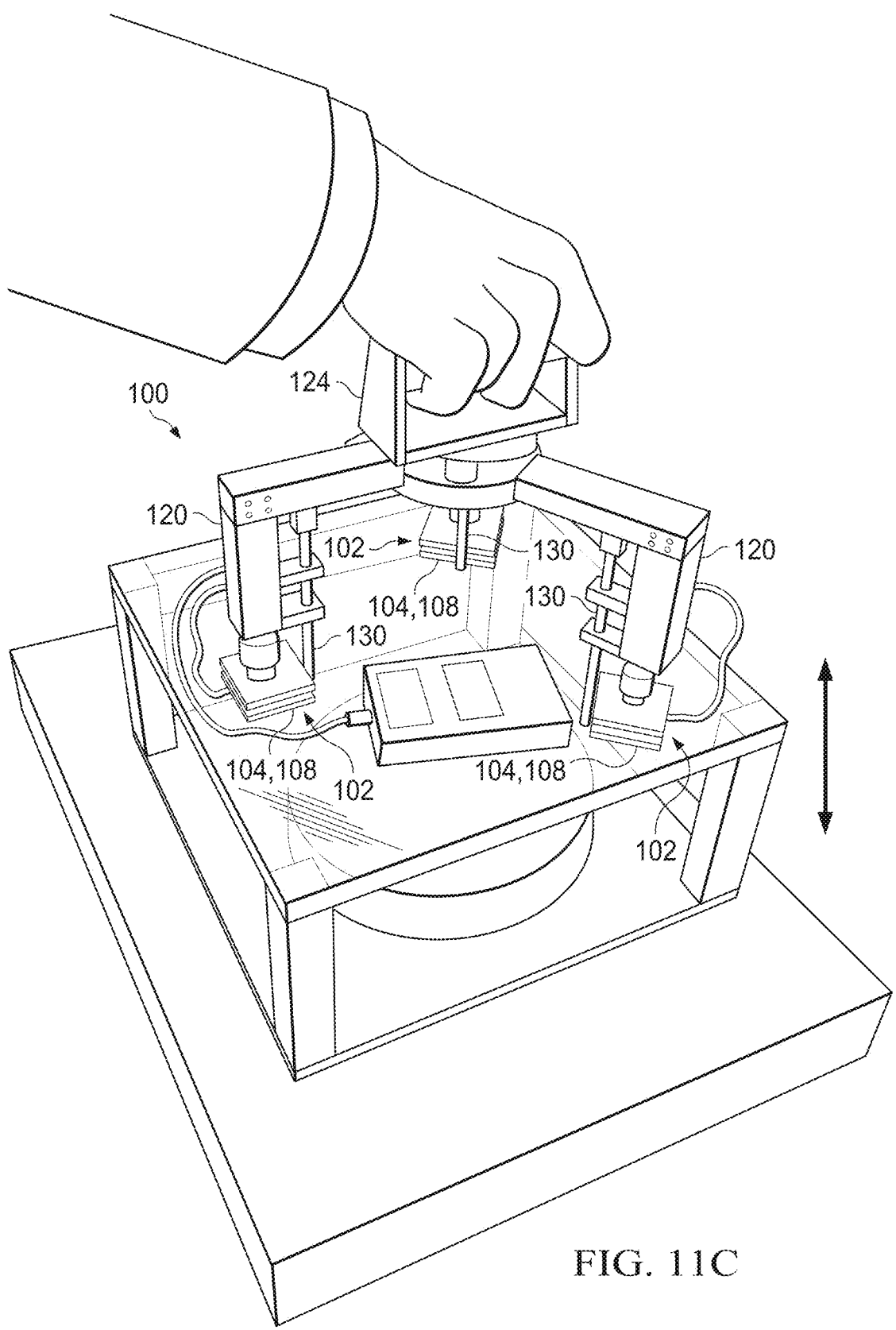
Figure 11D:
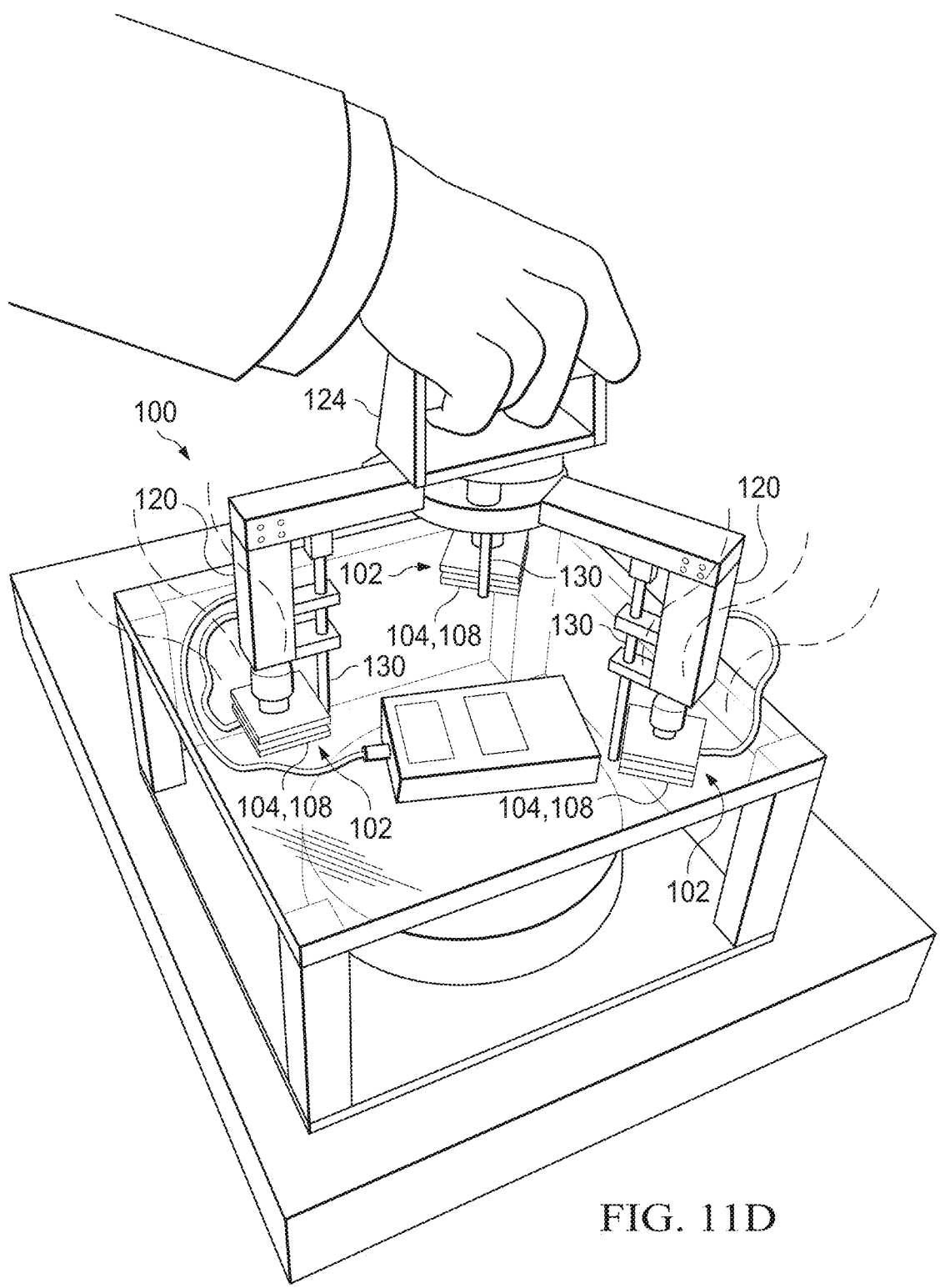
Figure 12:
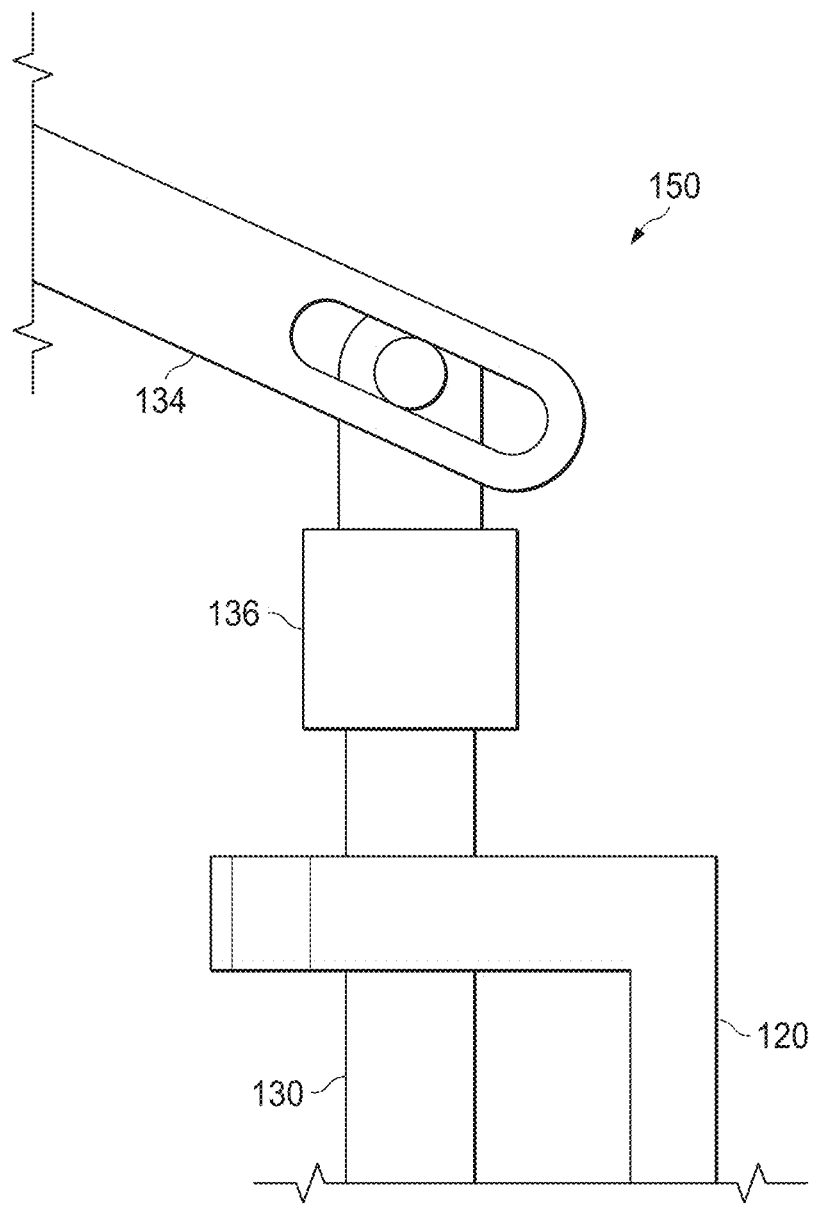
FIG. 12 is a schematic of a pin-in-slot joint used between links.

During the picking step of a pick-and-place maneuver, the SMP dry adhesive 104 may be heated up to the rubbery state and the gripper 100 may come into contact with a target object, as illustrated in FIG. 11A. A preload may be applied and the SMP dry adhesive 104 may be cooled down to the glassy state simultaneously, as shown in FIG. 11B. While the SMP dry adhesive 104 is in this state, the gripper is ready for picking and placing of the target object due to the strong adhesion of the SMP dry adhesive 104, as indicated in FIG. 11C. During the placing step, as illustrated in FIG. 11D, the SMP dry adhesive 104 may be heated up to the rubbery state and thus to the weak adhesion state. With the operator's manipulation, a releasing force may be applied to peel the SMP dry adhesive 104. As a result, the gripper 100 is able to place the target object.

Figure 11E:
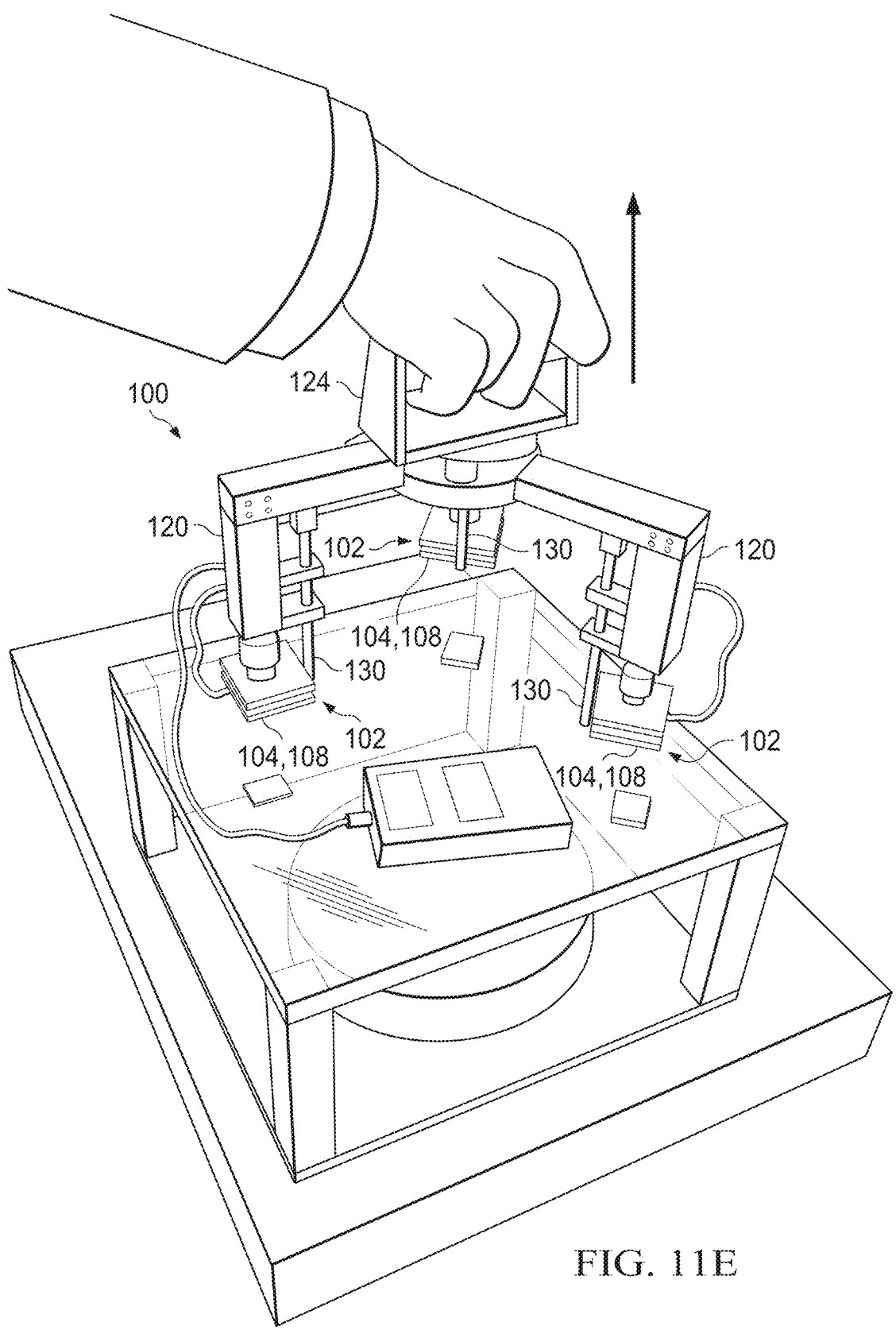

A method of using the adhesive gripper 100 for a pick-and-place maneuver is described now in greater detail. The method may include engaging the handle portion 124 to move the adhesive gripper 100 to a pick-up position where at least one foot 102 is in contact with an object, and the SMP dry adhesive 104 of the at least one foot 102 may be heated above a glass transition temperature thereof, as shown in FIG. 11A, in order to transition the shape memory polymer 108 to a rubbery state. A pressing force may be applied to the handle portion 124, as shown in FIG. 11B, thereby compressing the SMP dry adhesive 104 from an undeformed configuration to a deformed configuration while in contact with the object. The SMP dry adhesive 104 may be cooled in order to transition the shape memory polymer 108 to a glassy state and bind the object to the SMP dry adhesive 104 in the deformed configuration. The handle portion 124 may be engaged to pick up and move the object bound to the SMP dry adhesive 104 to a desired position for placement onto a substrate, as shown in FIG. 11C. Once in the desired position, the SMP dry adhesive 104 may be heated above the glass transition temperature to induce a return to the undeformed configuration, as shown in FIG. 11D, and a pulling force may be applied to the release ring 128, which is visible in FIGS. 10A and 10B. Due to the pulling force, the one or more releasing rods 130 may be pressed into the substrate and the object bound to the SMP dry adhesive 104 may be released onto the substrate, as shown in FIG. 11E.

EXAMPLES

Fabrication of SMP Dry Adhesive

The SMP dry adhesive that is used in these examples may be prepared as described below. First, poly(Bisphenol A-co-epichlorohydrin), glycidyl end-capped with a molecular weight of 1075 g/mol from Sigma-Aldrich, hereafter called E1075, and diglycidyl ether of bisphenol A epoxy monomer with a molecular weight of 362 g/mol from Momentive, hereafter called EPON 826, are preheated in a 110° C. oven. When they are completely melted, E1075 and EPON 826 are mixed to make the epoxy monomer. The curing agent Jeffamine D-230 poly(propylene glycol)bis(2-aminopropyl) ether with an average molecular weight of about 230 from Huntsman, hereafter called Jeffamine, is then mixed into the epoxy monomer. The weight-based mixing ratio of E1075: EPON 826:Jeffamine is 0.940:1.000:0.837 for the stiff SMP and 0.334:1.000:0.707 for the soft SMP. The resulting SMP precursor is poured on a glass slide (e.g., 3×2 inch) covered with PTFE tape (Tapecase), and air bubbles inside the mixture are removed using a pipette. The curing takes place in a hot oven at 80° C. for 120 minutes. After the SMP is fully cured, it is easily peeled off from the PTFE tape in its glassy state.

Two types of SMP dry adhesive samples are prepared. The first type is used to quantitatively evaluate their adhesion strength upon diverse compositional and topological design variations. For a single SMP dry adhesive sample, as shown in FIG. 4, a cured stiff SMP may be cut into round shape (e.g., having a 25 mm diameter) using a suitable tool such as a laser cutter (e.g., Fusion M2 laser cutter from Epilog Laser). Another single SMP dry adhesive sample can also made of a cured soft SMP prepared in the same way. For a dual SMP dry adhesive sample, a cured soft SMP may be cut into a ring shape (e.g., having a 5 mm width and 25 mm outer diameter) using the laser cutter or other suitable tool, and then a stiff SMP precursor may be filled in the center hollow area and cured, as shown in FIGS. 7A and 7B. The completed SMP dry adhesive samples may ultimately be attached to a backing aluminum block using an adhesive such as Loctite Instant Mix epoxy. For a SMP dry adhesive sample with a release tip, as shown in FIG. 5, a cured stiff SMP may be cut into a round shape (e.g., having a 25 mm diameter). Then a single drop of stiff SMP precursor may be placed on the cured stiff SMP sample using a pipette. In one example, the release tip may be about 8.5 mm away from the center with a radius of about 5 mm and a maximum height of about 0.6 mm. The second type of SMP dry adhesive samples used for the pick-and-place demonstration may be made by directly pouring and curing the stiff SMP precursor on aluminum plates. After curing, the plates may be attached to Peltier modules.

Adhesion Test Setup

The test setup to measure the adhesion strength includes a SMP dry adhesive fixed to a backing aluminum block, which is connected to a bucket through the pulleys using a fishing wire. The block has a cartridge heater and a thermocouple inside which are connected to a temperature controller. To measure the maximum adhesion of the SMP dry adhesive, the SMP is first heated to approximately 80° C. to reach its rubbery state. Then, a preload of 12.67 kg (2.50 atm) is applied to the SMP dry adhesive to achieve conformal adhesive contact with an acrylic target plate. During preloading, the heater is off and the SMP dry adhesive is cooled. After cooling to approximately 30° C., the SMP reaches the glassy state, and water is slowly pumped into the bucket. To measure the minimum adhesion of the rubbery SMP adhesive, the glassy SMP adhering to the acrylic target plate is reheated to approximately 80° C. before slowly pumping water into the bucket. The maximum or minimum adhesion strength of the glassy or rubbery SMP is recorded when the SMP dry adhesive fails in adhering to the acrylic target plate by measuring the weight of water and the bucket.

Heating and Cooling Modules

While a simple cartridge heater is used to heat the SMP dry adhesive for the adhesion strength test, the final SMP dry adhesive gripper uses a Peltier module (TEC1-12710) not only to heat but also to actively cool the SMP. FIG. 6 shows an exemplary Peltier module 144 between two aluminum plates 110. The thickness of the aluminum plates is chosen to be 2 mm in this example since it is thin enough for the heat to quickly reach the SMP, but thick enough to have tap holes. When using the Peltier module 144, fins 142 are used as shown to release heat such that the whole system does not heat up. Otherwise, the SMP dry adhesive 104 may not be cooled sufficiently.

Picking Mechanism

Figures 13A, 13B:
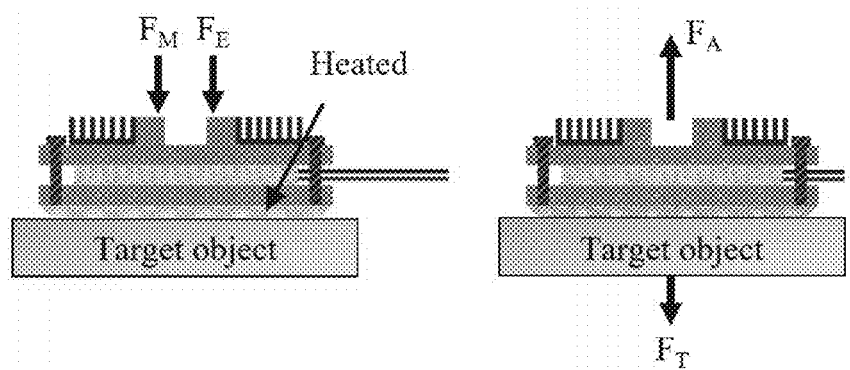
FIGS. 13A and 13B show a free body diagram of the foot of an adhesive gripper with forces during preloading and picking, respectively.

In the picking step, a SMP dry adhesive is heated and brought down to a target object and ball joints between legs and feet passively rotate to achieve a conformal contact. FIG. 13A shows the step of applying a preload, which is the sum of the gripper weight ($F_M$) and an external force ($F_E$). Since the preload is critical to adhesive performance, it is desirable to have large $F_E$ to meet the below inequality where $P_{pre}$ is the minimum preload pressure to ensure reliable adhesive grip.

$$(F_M + F_E)/A > P_{pre} \quad (1)$$

After cooling, the SMP dry adhesive adheres to the target object and the gripper is able to pick it up. At this step, the weight of the target object ($F_T$) preferably does not exceed the adhesive force of the SMP ($F_A$), as shown in FIG. 13B. The adhesion strength of the SMP to a flat and smooth glass plate ($P_S$) is approximately 5-30 N/cm², as characterized previously.

Therefore, the maximum weight that the gripper can pick up may be $$F_T < F_A = P_S \times A \quad (2)$$

Using the magnitude of A in Table 1, $F_T$ should be smaller than 240 N if $P_S$ is assumed to be 5 N/cm² and $F_T$ should be smaller than 1440 N if $P_S$ is assumed to be 30 N/cm².

TABLE 1

Parameters of Exemplary SMP Adhesive Gripper

| Parameter | Symbol | Magnitude |
|---|---|---|
| Weight of the device | $F_M$ | 12.7 N |
| Minimum preload pressure | $P_{pre}$ | 15 N/cm² |
| Total SMP area | A | 48 cm² |
| Angle between the middle link and the leg | θ | 0-33.6° |
| Length from pivot point O to top link | $L_a$ | 25 mm |
| Length from pivot point O to bottom link | $L_b$ | 50 mm |
| Release ring pulling force | $F_H$ | 60 N |

Placing Mechanism

Figures 14A, 14B:
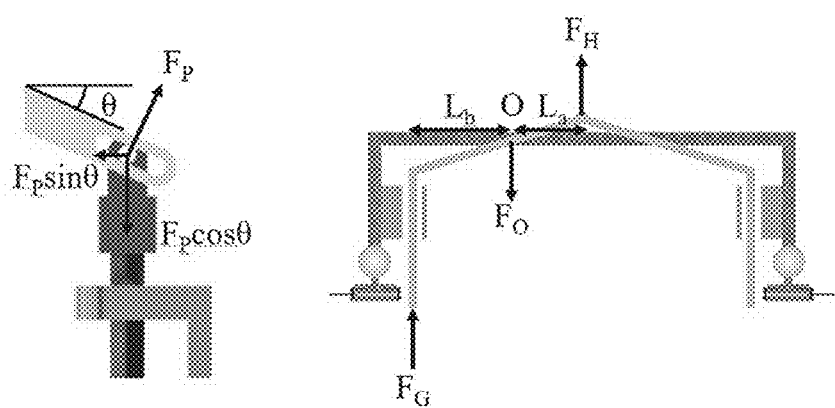
FIGS. 14A and 14B show a schematic of the pin-in-slot joint and the adhesive gripper, respectively, and a free body diagram of the links.

FIG. 14A provides another schematic of a pin-in-slot joint, which connects the middle and bottom links, including applied forces in use. Once the SMP adhesive gripper adheres to a target object, the links do not make any displacement such that a static situation can be assumed. In this static situation, the force is applied from the slot to the pin which is labeled as $F_P$ in FIG. 14A. This force can be split into the horizontal and vertical forces which are $F_P$ sine and $F_P$ cos θ, and thus $$F_P = F_P \cos\theta + F_P \sin\theta \quad (3)$$

Evidently, the vertical force ($F_P$ cos θ) is equal to the reaction force from the ground ($F_G$) which is labeled in FIG. 7b.

$$F_G = F_P \cos\theta \quad (4)$$

For placing the target object, applying a larger $F_G$ is more desirable since the SMP dry adhesive is more easily peeled off from the target object. Using (4), $F_G$ can be maximized by setting the initial angle of the middle link (e) to be zero.

FIG. 14B shows the forces that are applied to the middle link. Through the middle link, a force applied to the releasing ring is transferred to the releasing rods with mechanical advantage. $F_H$ is the force that is applied to the release ring per each leg in order to peel off the SMP dry adhesive and place the target object. Simultaneously, reaction force ($F_G$) is applied from the target object. In a static situation, the sum of the moment at the pivot point O should be zero, $$\Sigma M_O = F_H L_a - F_G L_b = 0 \quad (5)$$

Where $L_a$ and $L_b$ indicate the distance between point O and the bottom or top link. When $F_H$ of 60 N is applied, $F_G$ calculated to be 30 N by using (5) together with $L_a$ and $L_b$ in Table 1. In addition, for the force equilibrium, the following equation should be met in a static situation of the middle link in FIG. 7b

$$\Sigma F = F_H + F_G - F_O = 0. \quad (6)$$

Therefore, the force applied to the middle link at point O ($F_O$) is calculated to be 90 N. Simultaneously, the leg of the gripper receives the same amount of force as $F_O$ but in the opposite direction.

SMP Adhesion—Simulation

Figure 15A:
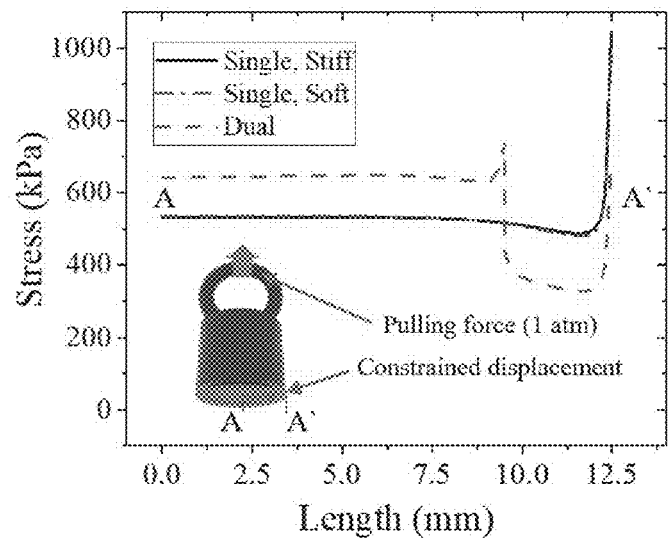
FIG. 15A shows a schematic of a dual-structure SMP dry adhesive attached to a rigid backing layer with its boundary condition and the plot of the first principal stress along the A-AX line computed using FEA.

To study the effect of the stiffness and composition of the SMP dry adhesive on its adhesion, a finite element analysis (FEA) on the first principal stress is conducted. As shown in FIG. 15A, the displacement is constrained at the SMP bottom surface which is in contact with a target plate. The external load is applied to the top of the aluminum block. Assuming that the SMP dry adhesive is in the glassy state at 30° C., Young's modulus is chosen as 2000 MPa for the stiff SMP and 1000 MPa for the soft SMP, which are inferred from the data in FIG. 1. The resultant first principal stress at the bottom surface of the SMP dry adhesive along the A-A' line is shown. Both stiff and soft single SMP dry adhesives shows extremely high stress concentration at the edge of the SMP. In contrast, the dual SMP dry adhesive shows that the stress is more evenly distributed toward the center which helps reduce the outer edge stress concentration. As a result of the reduced stress concentration at the outer edge, the contact failure starting at the outer edge occurs with higher external load. This indicates that the dual SMP dry adhesive may exhibit higher maximum adhesion strength than both of the single SMP dry adhesives investigated.

Figure 15B:
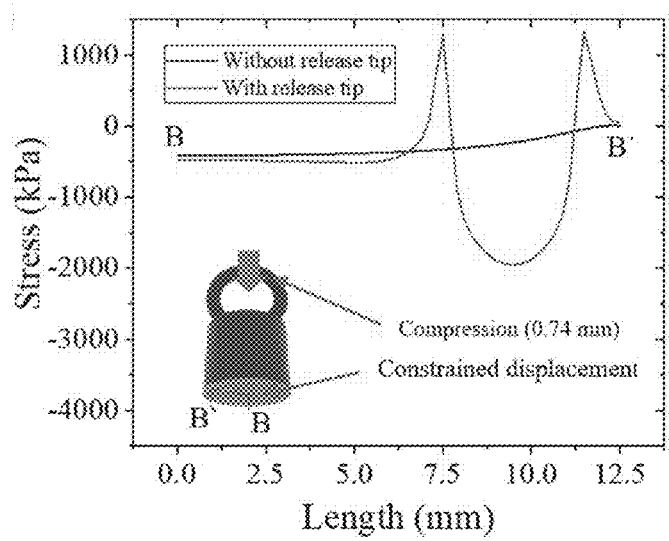
FIG. 15B shows a schematic of a SMP dry adhesive with release tip attached to the rigid backing layer with its boundary condition and the plot of the first principal stress along the B-B' line computed using FEA.

Further numerical analysis is conducted to compare the minimum adhesion strength of the rubbery SMP dry adhesive with and without the release tip. The boundary condition is shown in FIG. 15B. A prescribed displacement of 0.74 mm has been applied downwards to a target plate that does not deform. This value is chosen to completely compress the release tip (0.64 μm thick in this example) and ensure a small amount of additional compression of 0.1 μm to the rest of the SMP dry adhesive. Assuming that the SMP dry adhesive is in the rubbery state at 80° C., Young's modulus is chosen as 20 MPa. The resultant first principal stress that occurs at the bottom surface of the SMP dry adhesive along the B-B' line is shown. The SMP dry adhesive without the release tip only shows the compressive stress which increases towards the center. On the other hand, the SMP dry adhesive with the release tip shows a dramatic stress concentration near the release tip and both tensile and compressive stress. Consequently, if the prescribed displacement is removed in the rubbery state, the SMP dry adhesive with the release tip tends to pop up and may show self-peeling due to the high stress concentration near the release tip. However, the glassy state SMP dry adhesive with the release tip does not tend to pop up after being compressed since the compressed tip shape is fixed. Therefore, adding a release tip to the SMP dry adhesive reduces the minimum adhesion of the rubbery SMP dry adhesive and may enable its self-peeling without significantly compromising its maximum adhesion in the glassy state.

SMP Adhesion—Experimental Results

Figure 16A:
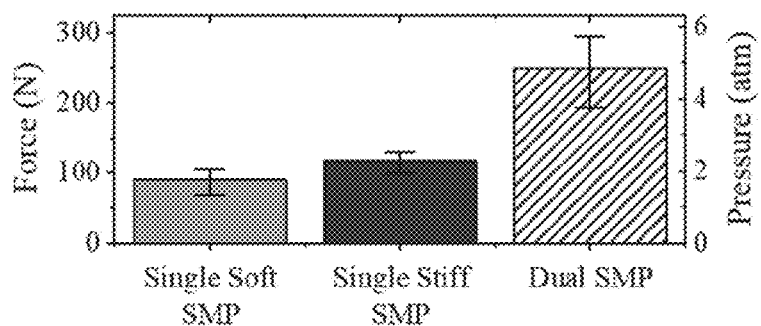
FIG. 16A shows the experimentally measured maximum adhesion strength of single and dual structure SMP dry adhesives.

The qualitative prediction of the enhanced adhesion strength and reversibility (the ratio between maximum and minimum adhesion strength) for the dual SMP dry adhesive and the release tip SMP dry adhesive are quantified through the experimental adhesion strength measurement. FIG. 16A shows the maximum adhesion strength of single and dual SMP dry adhesives measured using the test setup described above. After three tests per an individual sample, the average adhesion strength for the single soft SMP dry adhesive, single stiff SMP dry adhesive and dual SMP dry adhesive are measured to be 1.75 atm, 2.28 atm, and 4.83 atm respectively. FIG. 16A shows that the stress concentration for both single soft and stiff SMP dry adhesives are almost identical. However, the soft SMP dry adhesive accumulates more strain energy than the stiff SMP dry adhesive when the same load is applied, which means the soft SMP dry adhesive is more susceptible to contact failure. Therefore, the experimentally measured maximum adhesion strength of the soft SMP dry adhesive is smaller than that of the stiff SMP dry adhesive. More importantly, the maximum adhesion strength of the dual SMP dry adhesive is over twice as high as that of single SMP dry adhesives. Due to high stress concentration, the edge of the single SMP dry adhesives is more vulnerable to contact failure. However, as predicted in the simulation, the dual SMP dry adhesive distributes the stress more evenly from edge to center, and therefore the maximum adhesion strength is considerably enhanced.

Figure 16B:
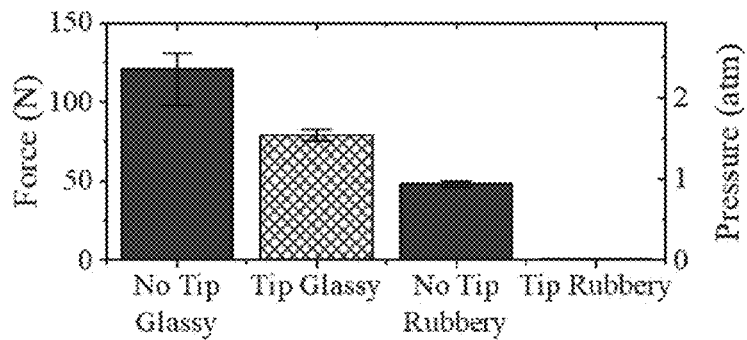
FIG. 16B shows the experimentally measured adhesion strength of SMP dry adhesives with and without a release tip in the glassy and rubbery states.

FIG. 16B shows the maximum and minimum adhesion strength of SMP dry adhesives with and without the release tip measured using the test setup described above. The results indicate that the maximum adhesion strength of the glassy SMP dry adhesives decreases from 2.35 atm to 1.54 atm once a release tip is added. However, the minimum adhesion strength, which is the required force to peel off the SMP dry adhesive in the rubbery state, dramatically decreases from 0.936 atm to 0.00955 atm when a release tip is added. Since the peeling force of the rubbery SMP dry adhesive with the release tip is almost negligible, it can be regarded as self-peeling. The self-peeling of the SMP dry adhesive may be quite beneficial in real-life applications even though the release tip sacrifices 34% of the maximum adhesion strength of the glassy SMP dry adhesive. Therefore, adopting the dual SMP structure with the release tip is expected to raise the adhesion strength and reversibility of the SMP dry adhesive more efficiently, since the results here show the maximum adhesion strength is increased while in the glassy state but the peeling force is decreased while in the rubbery state.

Temperature Analysis

Figure 17:
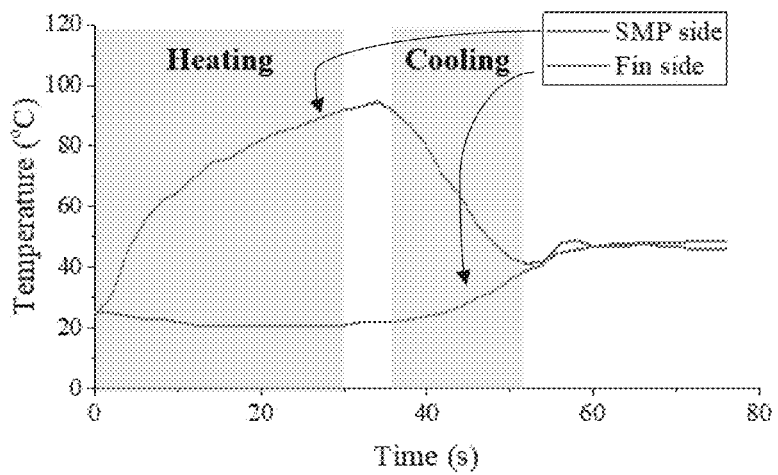
FIG. 17 shows a temperature profile of a foot of a SMP adhesive gripper as a function of time during heating and cooling with a Peltier module.

A thermocouple is utilized to characterize the temperature profile of the SMP adhesive gripper foot that is heated and cooled with a Peltier module powered by a fully charged 3-cell LiPo battery. In FIG. 17, the "SMP side" indicates the temperature of the SMP dry adhesive and the "fin side" indicates the temperature of the heat releasing fin. For the first 30 seconds, heat flows from the fin side to the SMP side since the heating switch is on. After 20 seconds of heating, the SMP temperature is raised over 80° C. Between 36 seconds and 52 seconds, the cooling switch is on so that the current flows in the opposite direction. In this condition, the heat flows from the SMP side to the fin side, which remarkably reduces the cooling time compared to natural convection cooling. Immediately after the cooling switch is off, the SMP side temperature becomes about 40° C. However, due to residual heat in the fin side, the final temperature of the SMP side is raised up again to 48° C. and slowly decreases. It is worthwhile to note that high adhesion of the SMP dry adhesive is still achieved even slightly above the $T_g$ (about 40-50° C.) since the SMP dry adhesive actually passes through a glass transition temperature range, not a sharp transition at $T_g$, which is inferred from FIG. 1.

Demonstration

To demonstrate the pick-and-place of the SMP adhesive gripper operated with one hand, a 30 cm×30 cm×14 cm stage with an acrylic plate top is built. FIGS. 11A and 11B show the picking step where the SMP dry adhesive is heated over 90° C., then preloaded and at the same time cooled down to 40° C. A mass of 4.5 kg is added to the stage and the SMP adhesive gripper picks up this weight as shown in FIG. 11C. Finally, FIGS. 11D and 11E show that the SMP dry adhesive is reheated over 90° C. and a releasing force is applied to place the weight.

Figure 18:
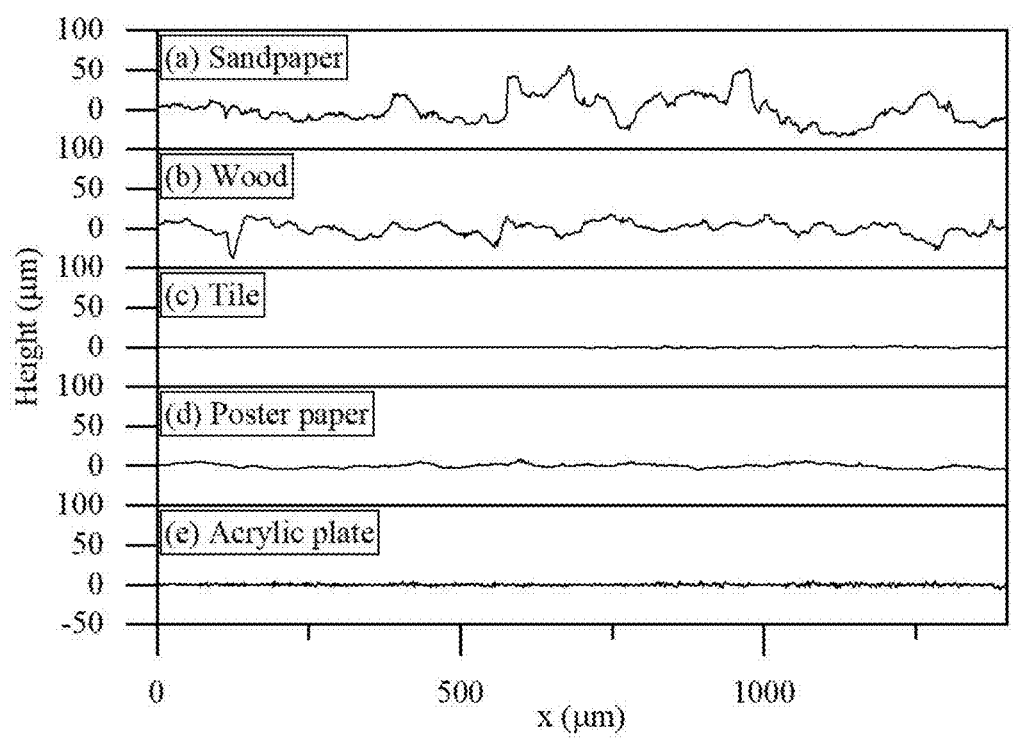
FIG. 18 shows surface roughness profiles of (a) a sandpaper, (b) a wooden plate, (c) a tile, (d) a poster paper, and (e) an acrylic plate, which were all successfully used in a picking demonstration.

The SMP dry adhesive described in this disclosure is capable of adhering not only to dry, flat and smooth surfaces but also to wet, non-flat or moderately rough surfaces. The SMP adhesive gripper is able to pick up surfaces with various roughness, an angled surface, and a wet surface. These results show a highly positive prospect on the use of the SMP adhesive gripper in practical situations. Surface roughness profiles of sandpaper, wood, tile, poster paper and acrylic plate surfaces used in the demonstration are obtained using Keyence VK-X1000 3D laser scanning confocal microscope, as shown in FIG. 18. Based on these surface profile data, the arithmetic average roughness ($R_a$) magnitudes of the surfaces are 14.1 µm (sandpaper), 6.58 µm (wood), 0.267 µm (tile), 2.04 µm (poster paper), and 0.983 µm (acrylic plate), respectively.

To summarize, in this investigation, a gripper utilizing an SMP dry adhesive has been designed, fabricated and tested. Picking and placing mechanisms have been analyzed to enable operating the gripper with a single hand. The dual SMP dry adhesive that comprises SMPs of two different stiffnesses is found to more evenly distribute stress at the adhesive interface, resulting in retarded contact failure and enhanced adhesion strength. Also, the SMP dry adhesive with the release tip shows easy detachment in the experiment due to high stress concentration around the release tip. To optimize thermal conditions associated with the SMP adhesive gripper, a Peltier module is employed. Using Peltier modules for fast cooling is beneficial since reduced cooling time allows for more stable adhesive contact of the SMP dry adhesive against any disturbance, including vibration during cooling. The numerical and experimental results show the successful pick-and-place capabilities of the SMP adhesive gripper and the feasibility of potential use for wall climbing applications.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A foot of an adhesive gripper for pick-and-place maneuvers, the foot comprising:
   a shape memory polymer (SMP) dry adhesive comprising a shape memory polymer and having a front side for the attachment and detachment of objects, the shape memory polymer having a first stiffness;
   a soft polymer layer on a back side of the SMP dry adhesive, the soft polymer layer having a second stiffness less than the first stiffness; and
   a rigid backing layer attached to the soft polymer layer.

2. The foot of claim 1, wherein the front side of the SMP dry adhesive comprises a planar adhesion surface.

3. The foot of claim 1, wherein the front side of the SMP dry adhesive comprises a nonplanar adhesion surface.

4. The foot of claim 1, wherein the nonplanar adhesion surface comprises a release tip to facilitate release of objects.

5. The foot of claim 1, further comprising a heating and/or cooling mechanism secured to the rigid backing layer.

6. The foot of claim 1, wherein the soft polymer layer comprises an elastomer or a shape memory polymer.

7. The foot of claim 1, wherein the SMP dry adhesive has a dual structure comprising the shape memory polymer having the first stiffness and further comprising a second shape memory polymer having a third stiffness, the first stiffness being higher than the third stiffness,
   wherein the shape memory polymer is disposed at a center of the SMP dry adhesive and the second shape memory polymer is disposed along a perimeter of the SMP dry adhesive.

8. An adhesive gripper for pick-and-place maneuvers, the adhesive gripper comprising:
   one or more legs, each leg terminating in a foot rotatably connected to the respective leg, each foot comprising:
      a SMP dry adhesive comprising a shape memory polymer; and
      a rigid backing layer attached to a back side of the SMP dry adhesive, a front side of the SMP dry adhesive being available for attachment and release of objects,
   a handle portion connected to the one or more legs;
   a release mechanism comprising a release ring within the handle portion and one or more releasing rods integrated with the one or more legs for release of an object onto a substrate.

9. The adhesive gripper of claim 8, wherein each foot is rotatably connected to the respective leg by a ball joint.

10. The adhesive gripper of claim 8, wherein each of the one or more releasing rods is slidingly connected to the respective leg, and
    wherein a pulling force applied to the release ring is transferred to the one or more releasing rods as a force directed into the substrate, thereby facilitating release of the object.

11. The adhesive gripper of claim 8, wherein the shape memory polymer is a first shape memory polymer, and wherein the SMP dry adhesive has a dual structure comprising the first shape memory polymer having a first stiffness and a second shape memory polymer having a second stiffness, the first stiffness being higher than the second stiffness.

12. The adhesive gripper of claim 11, wherein the first shape memory polymer is disposed at a center of the SMP dry adhesive and the second shape memory polymer is disposed along a perimeter of the SMP dry adhesive.

13. The adhesive gripper of claim 8, wherein the shape memory polymer has a first stiffness, and further comprising a soft polymer layer on the back side of the SMP dry adhesive between the SMP dry adhesive and the rigid backing layer, the soft polymer layer having a second stiffness less than the first stiffness, and the rigid backing layer being attached to the soft polymer layer.

14. A method of using the adhesive gripper of claim 8 for a pick-and-place maneuver, the method comprising:
    engaging the handle portion to move the adhesive gripper to a pick-up position where at least one foot is in contact with an object;
    heating the SMP dry adhesive of the at least one foot above a glass transition temperature thereof, thereby transitioning the shape memory polymer to a rubbery state, and applying a pressing force to the handle portion, thereby compressing the SMP dry adhesive from an undeformed configuration to a deformed configuration while in contact with the object;

cooling the SMP dry adhesive, thereby transitioning the shape memory polymer to a glassy state and binding the object to the SMP dry adhesive in the deformed configuration;

engaging the handle portion to pick up and move the object bound to the SMP dry adhesive to a desired position for placement onto a substrate; and heating the SMP dry adhesive above the glass transition temperature to induce a return to the undeformed configuration while applying a pulling force to the release ring to press the one or more releasing rods into the substrate, thereby releasing the object bound to the SMP dry adhesive onto the substrate.

* * * * *